Sept. 22, 1970    R. M. FACHINI ET AL    3,529,712
BALE DRIVE WHEEL
Filed Nov. 5, 1968    2 Sheets-Sheet 1
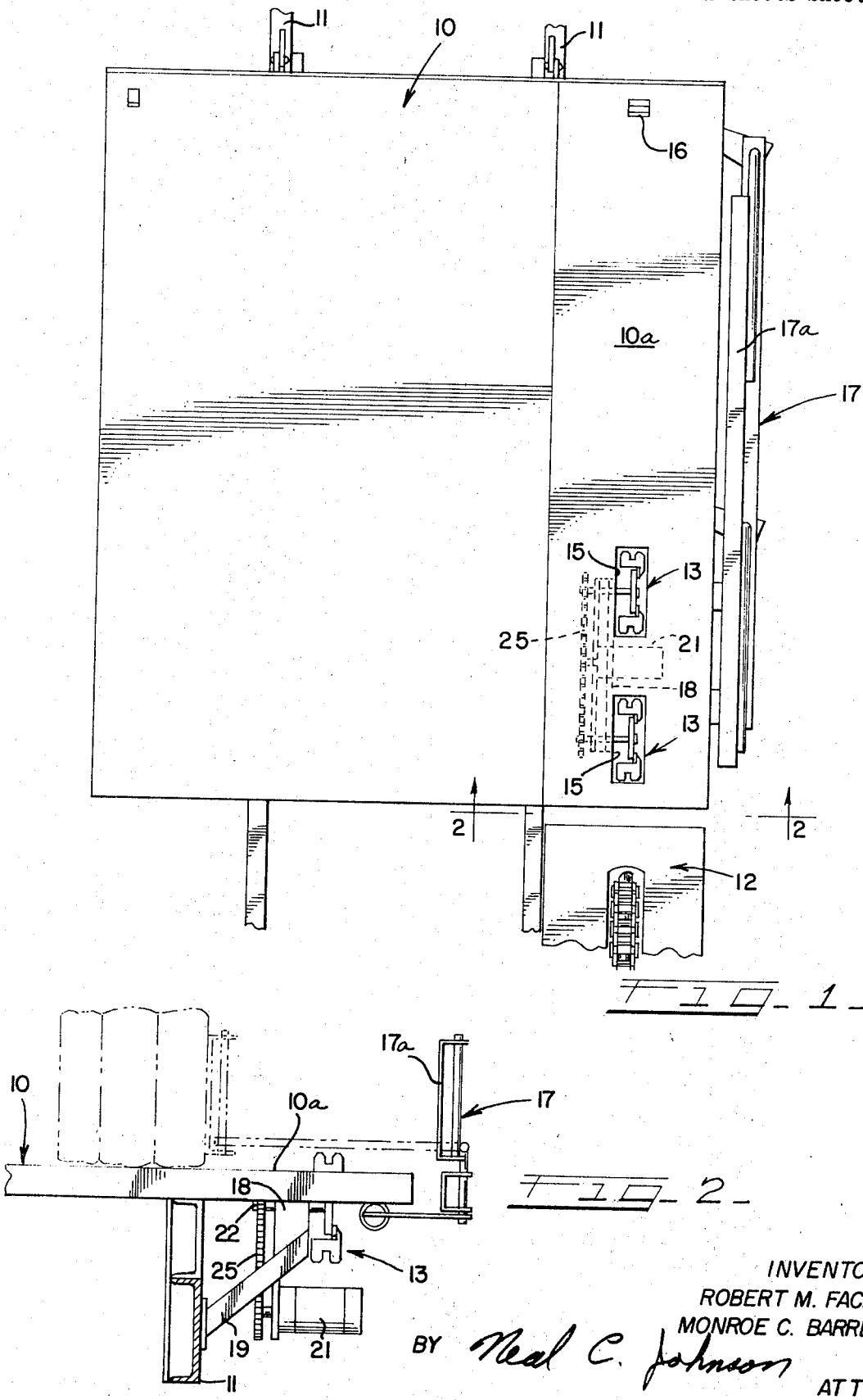
INVENTORS
ROBERT M. FACHINI
MONROE C. BARRETT
BY Neal C. Johnson
ATT'Y.

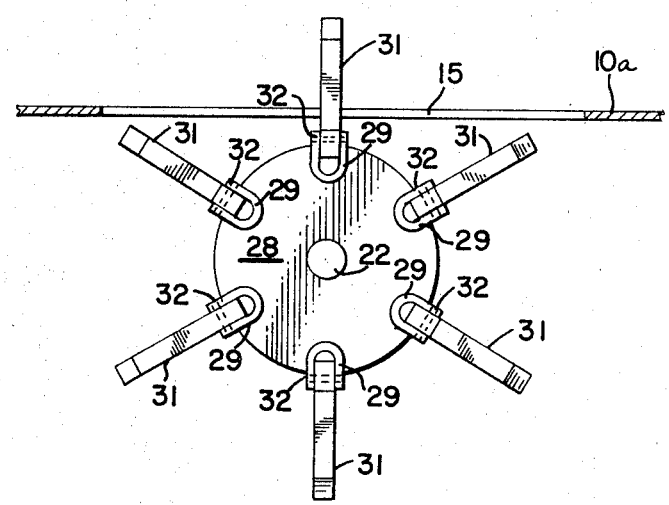
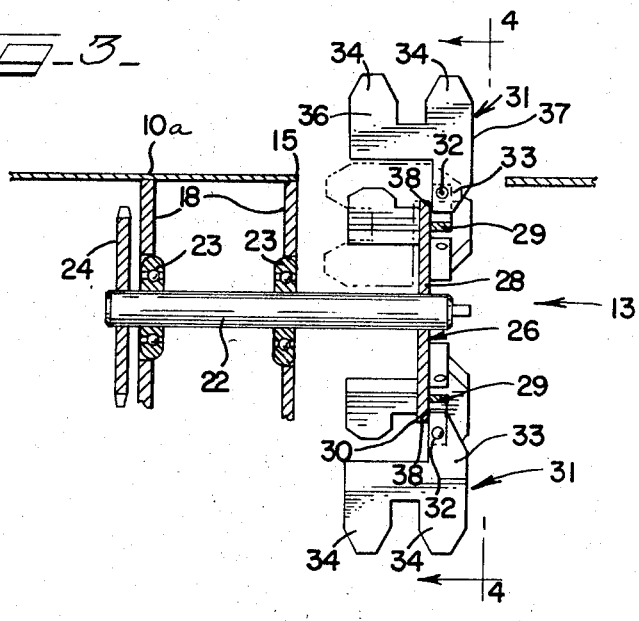

United States Patent Office 3,529,712
Patented Sept. 22, 1970

3,529,712
BALE DRIVE WHEEL
Robert M. Fachini and Monroe C. Barrett, Memphis, Tenn., assignors to International Harvester Company, Chicago, Ill., a corporation of Delaware
Filed Nov. 5, 1968, Ser. No. 773,552
Int. Cl. B65g 43/00
U.S. Cl. 198—40                                                9 Claims

ABSTRACT OF THE DISCLOSURE

A bale conveying apparatus comprising a wheel rotatable about a fixed axis and a plurality of bale-engaging elements pivotally mounted on said wheel. The elements are yieldable axially relative to said wheel from a radial, bale-engaging position to an axial, retracted position so that bales accommodated on said conveyor may be moved therefrom in a direction transverse the plane of rotation of said wheel.

BACKGROUND AND SUMMARY OF THE INVENTION

This invention relates generally to bale handling equipment and more particularly to a bale conveyor.

This invention finds application in the automatic and semi-automatic bale handling systems such as the automatic bale wagon and the mow loading systems. The conventional conveyors used in these systems generally take the form of chains or rollers provided with bale-engaging lugs. The orbiting lugs penetrate the bale gaining sufficient bite therein to transmit forces thereto. Because of the lug penetration, this type of conveyor cannot readily accommodate movement of a bale situated thereon in a direction transverse to the plane of orbit. The lugs imbedded in the bale present obstruction which resist transverse movement of the bale resulting in irregular and unpredictable operation of the system as a whole.

The purpose of the present invention is to provide a versatile conveyor or roller with pivotal bale-engaging lugs which enable the bale to be moved transversely by a cooperatively arranged receiving mechanism.

The invention is described in connection with an automatic bale wagon and the preferred embodiment is in the form of a roller. However, it will be apparent to those skilled in the art that the principles exemplified therein are equally applicable to other forms of bale handling equipment and other applications such as chain conveyor or elevators.

The roller contemplated by this invention comprises a wheel mounted for rotation about a fixed axis having a hub and a plurality of bale-engaging elements circumferentially spaced about the periphery of the hub. The elements are freely pivotable about their connection points to the hub so that the centrifugal force of rotation maintains the elements in a radial bale-engaging position. The elements are adapted to penetratingly engage a bale thereby providing a contact surface for transmitting forces thereto. The elements are pivotable to a retracted position below the surface of the conveyor in response to the application of forces transverse to the plane of rotation of the wheel. Thus, it will be appreciated that in its pivotable movement, the bale penetrating portion of the elements withdraws from the bale thereby permitting a smooth transverse movement of a bale as the transverse forces are applied thereto.

BRIEF DESCRIPTION OF THE DRAWINGS

FIG. 1 is a plan view of a bale accumulating table incorporating the novel bale conveyor of this invention;
FIG. 2 is a fragmentary sectional view of the accumulator table shown in FIG. 1 and taken generally along the plane indicated by the lines 2—2 of FIG. 1;
FIG. 3 is a sectional view of the conveyor wheel shown detached from the accumulator table of FIG. 1; and
FIG. 4 is a side view of the wheel shown in FIG. 3 as viewed from a plane indicated by the lines 4—4 of FIG. 3.

DESCRIPTION OF THE PREFERRED EMBODIMENT

The novel bale conveyor of this invention will be described in connection with an automatic bale wagon but it should be understood that the principles exemplified by this invention are equally applicable in other bale handling devices.

With reference to FIGS. 1 and 2 a bale accumulator table 10 is shown mounted on a bale wagon chassis 11. For purposes of brevity, only the accumulator table 10 of the bale wagon is shown.

A pickup elevator 12 mounted on the chassis 11 functions to deposit a bale on an elongate bale receiving portion 10a of the accumulator table 10, the longitudinal axis of the bale extending in a fore and aft direction. The portion 10a constitutes the conveyor frame and supports the various components of the conveyor drive assembly described below. A pair of bale drive assemblies designated generally as 13, 13 are spaced along portion 10a and have peripheral portions extending through slots 15 formed in the frame portion 10a. The drive assemblies 13, 13 engage the underside of the bale at longitudinally spaced intervals thereby providing a force transmittal surface for translating the bale rearwardly.

A second bale delivered by the pickup elevator 12 is deposited on the portion 10a whereupon the drive assemblies 13 move it rearwardly pushing the first bale ahead of it. The rearward movement of the two-bale row arranged in end-to-end abutting relation actuates a trip lever 16 situated at the rear of the elongate portion 10a. The lever 16 through conventional means actuates a pusher assembly shown generally as 17 whereupon a pusher plate 17a is moved transversely to the broken line position of FIG. 2. This action forces the two-bale row in a transverse direction clearing the portion 10a for a subsequent row. This operation is repeated until a multi-row layer is formed in the accumulator table 10. The table 10 is then upended to deliver the layer to a stack-receiving bed. Since the second bale of each two-bale row must move transversely with respect to the elongate portion 10a, the drive assemblies 13, 13 must be provided with means for accommodating such movement. Conventional wheels or conveyors tend to hang up on the bale thereby impeding the transverse movement.

The assemblies 13, 13 are each identical and are adapted to be driven by a common power source. With reference to FIGS. 1, 2, and 3, a channel type bracket 18 is mounted beneath the table 10 by a brace 19 secured to the chassis 11. A hydraulic motor 21 of the rotary type is supported from the bracket 18 beneath the assemblies 13, 13. As best shown in FIG. 3, each of the assemblies 13, 13 includes a horizontal shaft 22 journaled on the bracket 18 at axially spaced points by bearings 23, 23. A sprocket 24 is secured on an end of the shaft 22 as shown. An endless chain 25 drivingly interconnects the sprockets 24 with a drive sprocket (not shown) of the motor 21. Accordingly, the assemblies 13, 13 are driven in response to operation of the motor 21.

As best shown in FIGS. 3 and 4 each of the assemblies 13, 13 includes a wheel 26 mounted on the shaft 22. The wheel 26 includes a disc like hub 28 welded or otherwise secured to the shaft 26 and has a cylindrical rim 30. A plurality of U-shaped connectors 29 are attached to peripheral portions of the rim 28 and are positioned to open radially outwardly. The connectors 29 each receive a lug 31 which has an inner portion 33 pivotally connected to the connector 29 by means of a pin 32. The outer ends of each lug 31 are beveled to form teeth 34 and thereby enhance the bale penetrating quality of the lugs 31. An intermediate portion 36 of the lug 31 extends axially with respect to the axis defined by shaft 26 presenting a portion overhanging the hub 28. The intermediate portion 36 has an edge 37 in the form of a flat surface, and the inner portion 33 has a flat surface 38 which normally engages one side of the hub 28. Now when the shaft 26 is driven by the hydraulic motor 21 the wheel 14 is rotated at such a velocity that the centrifugal force of rotation tends to maintain the lug 31 in a radial position (solid line position of FIG. 3). In this position the surface 38 engages the flat side of hub 28 so that the teeth 34 project radially outwardly and trace a path which passes through the slot 15. When a force axial to the plane of rotation of wheel 14 is imparted on the teeth 34 and when such force exceeds the centrifugal force tending to maintain the lugs 31 in the radial position, the lugs 31 are yieldable about the pivot pin 32 in a direction transverse the plane of rotation of the wheel 14. The lugs 31 move to the axial position (broken line position of FIG. 3) wherein the flat portion 38 engages the rim 30 thereby maintaining the edge 37 in the attitude indicated. The edge is positioned slightly above the plane of the table 10 and partially spans the gap of slot 15 so that bales are not snagged by slot 15 when passing transversely thereacross.

The wheels 14, 14 may be continuously driven or intermittently driven. Intermittently driven wheels 14, 14 are stopped when the bales are moved transversely by the pusher 17. However, the teeth 34 generally are imbedded in the bale so that the pivotal movement from the solid line to the broken line position of FIG. 3 extracts them from the bale, permitting the bale to be moved transversely. In the continuously driven wheels each lug 31 upon approaching the bale will be in the radial position and will partially penetrate the bale. However, as the bale is moved transversely the axial force acting upon the teeth 34 overcomes the centrifugal force of rotation causing the lugs 31 to pivot towards the axial or broken line position of FIG. 3.

The operation of the novel drive assemblies 13, 13 of this invention will be described in connection with the overall operation of the bale accumulator table 10. As the bale is deposited on the elongate portion 10a by the elevator 12 the continuously rotating wheels 14, 14 engage the underside of the bale moving it rearwardly. The translatory forces are provided by the penetrating teeth 34. Note that the lugs 31 are constrained from pivotal movement in the direction of rotation so that forces are transmited in the bale directly from the shaft 26 through the linkage comprising the hub 28, the connector 29, and the lug 31. The bale is moved rearwardly until it clears the rear drive wheel 14. The second bale is similarly deposited on the receiving portion 10a whereupon the wheels 14, 14 engage the underside of the bale moving it rearwardly forcing the first bale ahead of it. The penetrating teeth 34 imparts sufficient force to the two-bale row to not only move it rearwardly but to actuate the mechanical trip lever 16. Because considerable force is required to trip lever 16, the positive force provided by the penetrating teeth 34 is essential. Actuation of the trip lever 16 puts into motion the pusher plate 17a moving the two-bale row transversely (see broken line position of FIG. 2). As the second bale of the two-bale row moves transversely over the slots 15, the upper lugs 31 move from the solid to the broken line positions of FIG. 3. This movement extracts the teeth 34 from the bale with minimum of damage to the bale, and the flat edge 37 partially closes the gap of slot 15 minimizing the chances of bale snagging in the opening between the teeth 34 and the slot edges.

Although the preferred embodiment of this invention has been described in connection with the bale wagon, it should be observed that this particular use is by way of illustration and should not be construed as limiting, and that the novel bale drive wheels can find utility in other bale handling systems.

What is claimed is:
1. A bale conveying wheel comprising:
a hub rotatable about a fixed axis;
a plurality of bale-engaging elements connected to the periphery of said hub at circumferentially spaced points, each of said elements being freely pivotable about fixed axis at said connection points; and
means for rotating said hub at such a velocity to maintain said elements in a radial, force transmitting attitude, said elements being yieldable axially about said fixed pivot points to thrust forces of predetermined magnitude.
2. A bale conveying apparatus comprising:
a frame providing a bale conveying surface having a slot formed therein; and
bale translating means including a shaft journaled to said frame and disposed below said surface, a wheel mounted on said shaft and including a hub, at least one bale-engaging element connected to said hub and pivotally movable relative thereto about a fixed axis, means for maintaining said element in substantially a radial position relative to said hub, and means for rotating said wheel, the path of rotation of said element passing through said slot and above the plane of said surface for transmitting translatory forces to bales accommodated thereon, said element being yieldable about said fixed axis in a direction transverse that of said plane of rotation whereby bales accommodated on said surface may be moved in a direction transverse that of the direction of bale translation.
3. A bale conveying apparatus comprising:
a frame providing a bale conveying surface having a slot formed therein; and
a wheel mounted on said frame and rotatable about a fixed axis disposed below said surface, said wheel having a hub and a plurality of bale-engaging elements pivotally connected to the periphery of said hub, said wheel being rotatable in a vertical plane, said elements passing through said slot and above said surface upon rotation of said wheel and adapted to engage bales accommodated on said surface thereby imparting translatory forces thereto, said elements being yieldable in a direction transverse to the plane of rotation of said wheel in response to thrust forces of predetermined magnitude thereon whereby a bale accommodated on said surface may be moved in a direction transverse that of the translatory forces.
4. A bale conveying apparatus comprising:
a frame providing a bale conveying surface having a slot formed therein; and
a bale translating means including a shaft journaled to said frame and disposed below said surface, a wheel corotatably mounted on said shaft and having a hub vertically aligned with said slot, a plurality of bale-engaging elements, means for connecting said elements to said hub whereby said elements are pivotally movable about said hub in an axial direction, and means for driving said shaft whereby said hub and said elements are rotated in a substantially vertical plane, a portion of said elements passing through said slot and above said surface for engaging and imparting forces to bales accommodated on said surface, the centrifugal force of rotation of said wheel tending to maintain said elements in a radial, bale-engaging attitude, said elements being pivotally yieldable axially in response to thrust forces of predetermined magnitude whereby bales translated by said translating means may be moved transversely relative to said plane of rotation of said wheel.

5. The invention as recited in claim 4 wherein each of said elements includes an inner portion pinned to said periphery of said hub and an outer portion provided with at least one bale penetrating tooth, and an intermediate portion having a flat edge.

6. The invention as recited in claim 5 wherein said connection means includes means for limiting pivotal movement of said elements between a radial position and an axial position relative to said axis of rotation, each of said elements in said radial position having said bale-engaging tooth projecting radially, and each of said elements in said axial position having said straight edge portion partially spanning said slot.

7. In a bale conveyor having a bale supporting surface, a force transmitting apparatus for imparting translatory motion to said bale accommodated on said surface, said apparatus comprising:
   a frame;
   a wheel rotatably mounted on said frame and including a hub having a circular periphery, a plurality of bale-engaging elements, and means for connecting said elements on said periphery so that said elements are freely pivotable in an axial direction relative said hub between a radial position and an axial position, the radial extent of said elements being greater in said radial position; and
   means for rotating said wheel at such a velocity that the centrifugal force of rotation maintains said elements in said radial position, said elements being pivotally yieldable about said connection means in response to a thrust force of predetermined magnitude.

8. A bale conveying apparatus comprising:
   a frame providing an elongate bale conveying surface having a slot formed therein;
   bale translating means including elements movable in a vertical plane through said slot for imparting forces to a bale accommodated on said surface; and
   means mounting said elements for movement out of said vertical plane in response to lateral movement of said bale on said surface.

9. A bale conveying wheel comprising:
   a hub having a circumferential periphery and rotatable about a principal axis;
   a plurality of bale-engaging elements;
   mounting means supporting said elements on said hub in respectively alternative positions of radial protraction and retraction with reference to said periphery, said mounting means facilitating retraction of the protracted elements responsive to force applied thereto axially of the hub;
   and means precluding displacement of the protracted elements relatively to the hub circumferentially thereof.

References Cited
UNITED STATES PATENTS 3,010,593   11/1961   Adams _____ 198—40

RICHARD E. AEGERTER, Primary Examiner

U.S. Cl. X.R.

198—31